May 7, 1929. H. WEINERT 1,711,979
ELECTRIC MACHINE WITH VARIABLE POLE NUMBERS
Filed Sept. 18, 1926
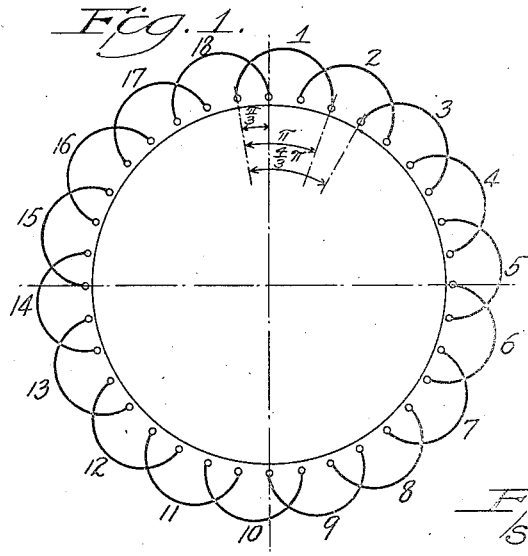
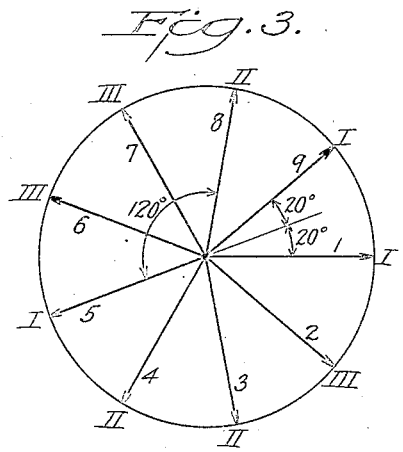
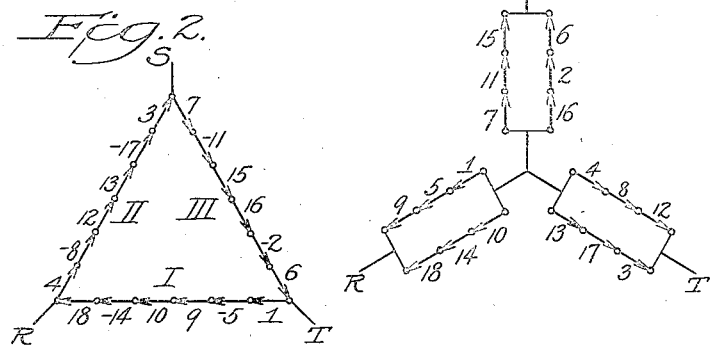
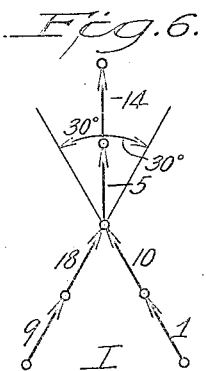
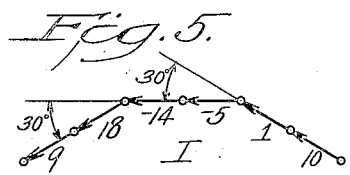
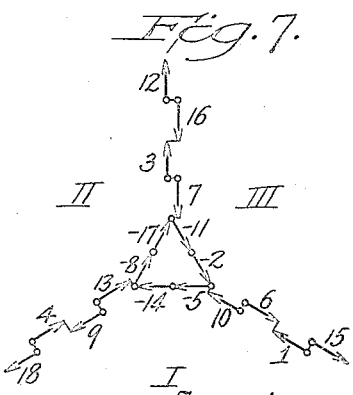
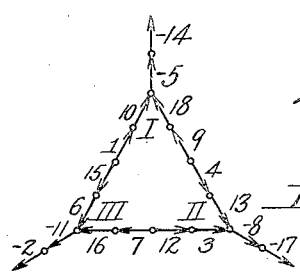
Inventor
Helmut Weinert
By his Attorneys Patented May 7, 1929.

1,711,979

UNITED STATES PATENT OFFICE.

HELMUT WEINERT, OF DRESDEN-KOTZSCHENBRODA, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY.

ELECTRIC MACHINE WITH VARIABLE POLE NUMBERS.

Application filed September 18, 1926, Serial No. 136,322, and in Germany, September 21, 1925.

My invention refers to a winding for electric machines which contains the winding elements of a $6n$-pole three-phase winding and in which these winding elements are arranged so relatively to each other that they form a $2n$-pole three-phase winding (whereby $n$ designates any desired whole number). My invention is of particular advantage in induction motors in which it is desired to produce varying speeds by a change in the number of poles. By the term "winding elements", used hereafter and in the claims, I understand the individual coil elements of which the entire winding is composed and which elements in themselves may be composed of a single turn or of a plurality of turns as the design of the machine may require.

A speed variation of a three-phase induction motor of the ordinary commercial type is only possible with losses by inserting a resistor in the armature circuit or by complicated arrangements, such as cascade connections and the like. For this reason pole changing connections are frequently made use of in three-phase motors in order to obtain at least certain distinct speed steps. Various windings and connections have already been proposed to produce a definite speed ratio. Generally however a certain winding and connection is only suitable for a very definite ratio, for instance 1:2 and in order to obtain further intermediate speeds it is again necessary to resort to other expedients, such as the employment of two motors in cascade connection or locating various windings upon one motor and so on.

My invention relates to a pole changing connection for a plurality of steps at the ratio of 2:3:6 with the same winding which by combination with the known change-over connection at the ratio of 1:2 can be extended to a multiple speed ratio of 2:3:4:6, all the coils being made use of for every pole number employed and a comparatively efficient utilization of the winding being thus obtained.

My invention is illustrated in the accompanying drawings, in which

Figure 1 represents the spacial distribution of the winding elements over the armature circumference of a standard 12 pole three-phase wound machine.

Figure 2 symbolically shows the manner in which the winding elements in Figure 1 are assembled in the novel manner to form a 4 pole three-phase winding.

Figure 3 represents a vector diagram explaining the principle on which the novel winding system is based.

Figure 4 shows a winding arrangement similar to that shown in Figure 2, except that star-connection is used.

Figures 5 and 6 show further modifications of the arrangement of the winding elements in Figure 1 within a new phase.

Figures 7 and 8 show the entire winding arrangement of the three-phases formed according to Figure 5 and, Figure 9 shows the entire winding arrangement of the phases formed in accordance with Figure 6.

The $12n$-pole three-phase winding according to the diagram, Figure 1, has the smallest possible number of winding elements, namely 18, whereby according to this diagram one slot per pole and phase is assumed. Of course, the invention may be applied by anyone skilled in this particular art also to windings having several slots per pole and phase and in this case, of course, a correspondingly greater number of winding elements are used.

For obtaining the pole number $2n$ in accordance with the present invention, I obtain the pole number $2n$ by forming among the $9n$ winding elements of the $6n$-pole winding one phase out of the groups formed by two adjacent winding elements and which groups are spaced on the armature the distance $3\pi$ apart and out of the single winding elements which are located between these two groups and which are transposed on the armature periphery relatively to these groups the distance of $\frac{8\pi}{3}$. The single winding elements are connected into this phase in reverse sense (for instance by exchanging their beginnings and ends). The value $2\pi$ here designates the angle of 360° with respect to a $3n$-pole fundamental winding.

Phase I, for instance, of the connection shown in Figure 2 consists of two groups of winding elements, one group consisting of elements 1, 18, and the other of elements 9, 10, these groups being separated by two single elements 5 and 14 displaced in relation to these groups each by $\frac{8\pi}{3}$. The elements 5 and 14 are connected according to Figure 2 with the beginnings and ends in opposite sense, which is indicated in the drawing by a minus sign while the direction arrows provided at the winding parts are not reversed. The two remaining phases II and III in Fig. 2 are connected according to the same rules. The individual phases possess with the winding elements corresponding with each other a mutual spacing of $2\pi$. A group of two adjacent winding elements of one phase thus is followed in Fig. 1 first by a single winding element of the second and then by a group of two winding elements of the third phase.

In the vector diagram Fig. 3 the function of the improved pole changing connection is more clearly illustrated. The vectors 1 to 9 represent therein the nine winding elements of a 6-pole winding ($n$ equal 1) in their position in space. According to the arrangement according to Fig. 2 the vectors 1, 9 and 5 then form phase I, the vectors 3, 4 and 8 the phase II and the vectors 6, 7 and 2 the phase III. For the pole number 4 the vector 5 of the phase I, for instance, possesses in relation to the resultant of the two vectors 9 and 1 a phase displacement in space of 360°. The winding element corresponding with the vector 5 may thus simply be connected in series in the same sense with the elements 1 and 9. For the pole number 2, on the other hand, the vector 5 possesses in relation to the resultant of the vectors 1 and 9 a phase displacement of 180°. It is therefore necessary that for the pole number 2 the winding element 5 be connected in the opposite sense in relation to the elements 1 and 2.

From Fig. 3 of the drawings it will also be seen that corresponding winding elements in the individual phases have a mutual spacing of 120°, for instance element 5 in phase I with relation to corresponding element 8 in phase II.

It will be readily understood that the phases of the $2n$-pole connection may be combined with each other by any known connection. The winding elements of one phase may equally well be connected in series or in parallel relation or partly in parallel and partly in series. The connection will preferably then be so chosen that in the iron an induction is obtained which is necessary for the desired torque in a given case and for a given pole number. Fig. 4 of the drawings shows, for instance, a connection in which the individual phases of Fig. 2 are subdivided into two parts and these parts are connected with each other in parallel relation. The individual phases are besides star-connected.

In the arrangements according to Figures 5, 7, 6, 9 and 8, the winding elements of the phases I to III formed according to Figure 2, are distributed over the sides of the delta and the arms of the star of a mixed star-delta connection. The subdivision according to my invention is carried out in such a manner that the various phase positions of the currents in the winding elements of one phase brought about by the subdivision correspond with the mutual displacements in space of these winding elements within the new pole division and the direction of the rotary field.

As will be seen from the vector diagram in Fig. 3 of the drawings, the two adjacent winding elements of one phase (for instance the elements 1 and 9 of the phase I) of the $2n$-pole connection deviate from their displacement in space of 180° to be aimed at in relation to the individual winding element (5) towards both sides by 20° each. Their mutual displacement amounts therefore to 40°. The two adjacent winding elements and the single winding element may be so subdivided on the rays and sides of a mixed star-delta connection that the currents in the three winding portions possess a time phase difference of 30° each, the current in one of the adjacent winding elements leading by 30° in relation to the current in the single winding element while the current in the second element lags by 30° in relation to the single element. By a correct choice of the direction of the rotating field the result is thus attained that the time phase displacements of the currents in the single elements developed by the subdivision approach the space phase displacements of the elements. In this manner the winding factor of the arrangement is improved.

In Fig. 5 of the drawings such a subdivision is illustrated on an example. The subdivision refers to the winding elements of the phase I of Fig. 2 of the drawings ($4n$ pole connection). The two adjacent winding elements of this phase, viz, the elements 1 and 18 or 9 and 10 are here divided between two star arms of the mixed star-delta connection. The two single winding elements 5 and 14 appertain on the other hand to the side of the delta located between the two star arms. In order that the currents in the adjacent elements may deviate in relation to each other by 60° and in relation to the single element by 30° in the phase, the winding elements in one of the star arms are connected in the reverse sense to the other so that, for instance, the elements 1 and 10 lead to the star point with their beginnings and elements 9 and 18 with their ends. This counterwise connection is indicated in the drawing by the direction of the arrows on the winding elements. For the 2n-pole connection according to Fig. 5 in which the arms of the star are connected in series with the sides of the delta, the result is obtained that during the passage through the winding sequence: star arm-delta side-star arm, all elements of the winding are connected in the same direction i. e. in series, as is indicated by the arrows, whereby the elements 5 and 14 appertaining to the delta side are arranged in this series connection in opposite sense, which is indicated by minus signs.

Fig. 7 shows the complete diagram of connections of the phases formed according to Figs. 2 and 5 for the 2n-pole connection. The single winding elements belonging to the delta sides are connected in opposite direction (indicated by minus signs), as already mentioned.

Fig. 6 illustrates another manner of the subdivision of the winding elements of the phase I of Fig. 2, the same effect being attained as by the subdivision according to Fig. 5. In Fig. 6 the adjacent winding elements of the phase I, 1 and 18 or 9 and 10 are subdivided on two delta sides of the star-delta connection and the single winding elements 5 and 14 form the star arm extending from the corner formed by these delta sides. In order that the phase of the current in the adjacent winding elements may again deviate by 60°, these winding elements are connected in one side of the delta in opposite direction to that in the other side, so that elements 9 and 18 as well as elements 1 and 10 lead with their beginnings to the corner point of the delta sides (indicated by the direction of the arrows). The phase of the current in the single winding elements is then again located between the phases of the currents in the adjacent winding elements and has in relation to these parts a phase displacement of 30° each. It thus adapts itself to the displacements in space of the winding elements of a phase within the pole pitches.

Figure 9 represents the complete 2n-pole diagram for the phases formed in accordance with the arrangement shown in Figure 6. The individual delta sides are composed in this figure from winding elements belonging to different phases which are indicated as in the remaining figures by I, II, III. This is further indicated by the direction of the arrows affixed to each winding element. For instance, phase I is formed in Figure 9, the same as in Figure 2, by the winding elements 1, 10, 9, 18, 5 and 14, phase II by the elements 3, 12, 13, 4, 8 and 17, and phase III by the elements 16, 7, 6, 15, 11 and 2.

The mixed star-delta connections according to the Figs. 5, 7, 6 and 9 have still the disadvantage that the current in the star rays possesses $\sqrt{3}$ times the value of the current in the sides of the delta so that it is necessary to construct the winding with different cross-sections if unequal heating is to be avoided. This drawback may to a sufficient extent be eliminated by connecting the elements of the winding in parallel or series relation. Fig. 8 shows, for instance, an arrangement corresponding with Fig. 7 (2n-pole connection), in which the four elements of the winding of a star arm are partly connected in parallel and partly in series relation. The arrangement is such that the two elements of a winding belonging to the same phase are connected in series, while the elements belonging to different phases are connected in parallel. It will be understood, however, that other modes of connection may equally well be chosen.

The above described pole changes may be carried out whether a winding with coils of equal or different width, single or double layer windings or other windings are employed. By the various windings the winding factors at the various pole numbers are varied and therewith, in certain cases, the magnetic induction.

The magnetic induction for one of the above described connections depends, as well known, primarily upon the voltage applied, the number of poles, the winding factor, the interlinking factor (ratio of the voltages or currents at different interlinkings of the phases), and from the number of the windings connected in series.

For instance, if a constant voltage is assumed (in order to avoid transformers) and the number of poles is fixed for a given connection, the magnetic induction and thereby the torque and the output of the motor for a definite case may be varied by changing the winding factor, the interlinking factor and the choice of the windings connected in series.

With the connections specified the winding factor mostly varies within itself and varies still further with the choice of the kind of winding.

The interlinking factor changes according to whether the winding is connected in star or in delta.

A great variety of ways is thus presented to fix for a certain case the magnetic induction and thus the torque of the motor.

Various modifications and changes may be made without departing from the spirit and the scope of the invention, and I desire, therefore, that only such limitations shall be placed thereon as are imposed by the prior art.

I claim as my invention:

1. An armature winding for electric machines having the $9n$ winding elements of a $6n$-pole three-phase winding, said winding elements being connected to form a $2n$-pole three phase winding such, that of the $9n$ winding elements the groups formed by two adjacent winding elements and spaced on the armature the distance of $6\pi$ form one phase together with the single winding elements located between these groups, which elements are spaced from each group the distance of $\frac{8\pi}{3}$, the single winding elements within each phase being connected in reverse sense.

2. An armature winding for electric machines having the $9n$ winding elements of a $6n$-pole mixed star-delta three-phase winding, said winding elements being connected to form a $2n$-pole three phase winding such, that of the $9n$ winding elements the groups formed by two adjacent winding elements and spaced on the armature the distance of $6\pi$ form one phase together with the single winding elements located between these groups, which elements are spaced from each group the distance of $\frac{8\pi}{3}$, the single winding elements within each phase being connected in reverse sense.

3. An armature winding for electric machines having the $9n$ winding elements of a $6n$-pole mixed star-delta three-phase winding, said winding elements being connected to form a $2n$-pole three phase winding such, that of the $9n$ winding elements the groups formed by two adjacent winding elements and spaced on the armature the distance of $6\pi$ form one phase together with the single winding elements located between these groups, which elements are spaced from each group the distance of $\frac{8\pi}{3}$, the single winding elements within each phase being connected in reverse sense, said star-delta winding being arranged so that the two adjacent winding elements are distributed over two delta sides, the beginnings of said two winding elements being connected to the corner formed by the two delta sides, the intermediate single element between said two winding elements being located in the star-arm emanating from said delta corner, and being connected with its beginning to the pertaining delta corner when the star arms and delta sides are connected in series.

In testimony whereof I affix my signature.

HELMUT WEINERT.